United States Patent [19]

Bishop et al.

[11] 4,351,887
[45] Sep. 28, 1982

[54] FOLDABLE METALLIC GAUZE PACK AND SEGMENT

[75] Inventors: David C. Bishop, London; Alan E. Heywood, St. Albans, both of England

[73] Assignee: Johnson, Matthey & Co., Limited, London, England

[21] Appl. No.: 143,480

[22] Filed: Apr. 22, 1980

[30] Foreign Application Priority Data

May 3, 1979 [GB] United Kingdom ............... 7915468

[51] Int. Cl.$^3$ ............................................. B32B 3/04
[52] U.S. Cl. ............................... 428/594; 252/477 R; 423/403; 428/596
[58] Field of Search .............. 428/590, 615, 594, 595, 428/596; 252/477 R; 423/403, 404; 156/227

[56] References Cited

U.S. PATENT DOCUMENTS

| | | | |
|---|---|---|---|
| 2,607,663 | 8/1952 | Perry et al. | 423/403 X |
| 3,000,217 | 9/1961 | McKinney et al. | 428/595 |
| 3,660,024 | 5/1972 | Gillespie | 423/403 |
| 3,715,193 | 2/1973 | Streitzoff | 252/477 R X |
| 3,792,982 | 2/1974 | David | 270/32 X |
| 3,890,104 | 6/1975 | Porta et al. | 252/477 R X |
| 3,915,898 | 10/1975 | Acres et al. | 252/477 R X |

Primary Examiner—Helen M. McCarthy
Attorney, Agent, or Firm—Cushman, Darby & Cushman

[57] ABSTRACT

This invention relates to a laminated article, particularly to such an article comprising a gauze pack containing two or more gauzes such as are typically used as catalyst catchment or getter means in nitric acid production plants.

Specifically, this invention provides a gauze pack segment suitable for locating in planar contiguous relationship with one or more further gauze pack segments to provide a gauze pack having a predetermined, for example, a regular geometric shape comprises a plurality of superposed gauze segments having at least when assembled substantially identical shape and area and held in fixed relationship one with another.

10 Claims, 24 Drawing Figures

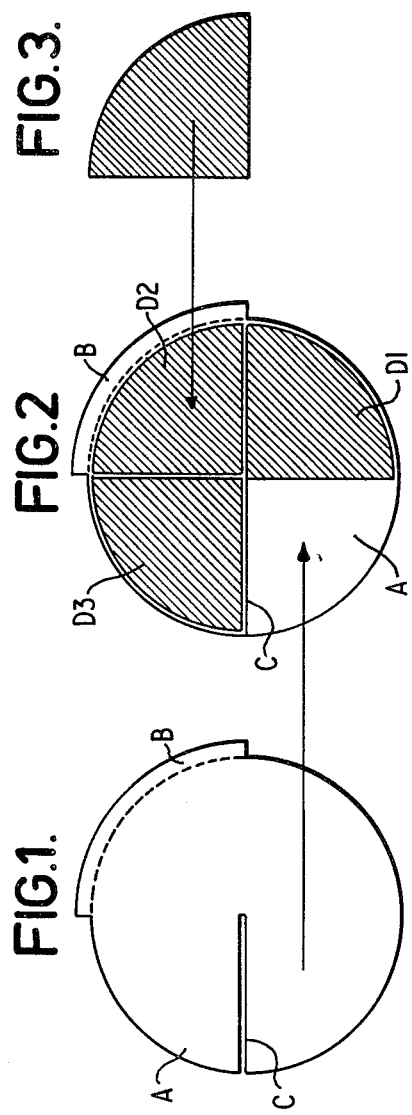

Second Folds

First Fold

FIG. X. (PRIOR ART)
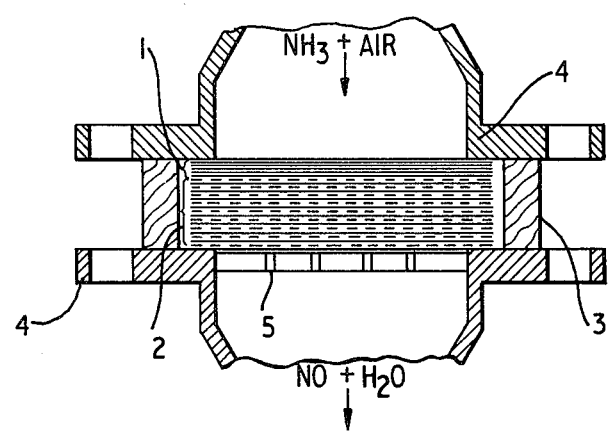
FIG. Y. (PRIOR ART)
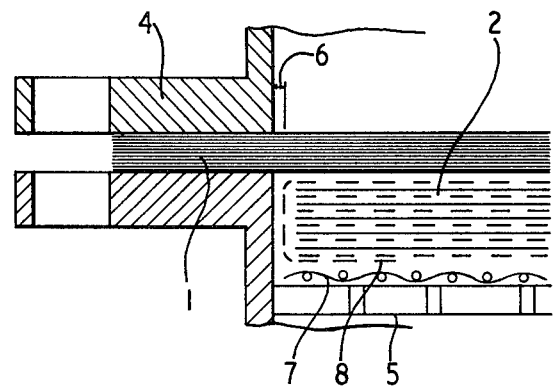
LEGEND FOR GAUZES 2 :-
— — — — —STAINLESS STEEL
————Au/Pd

FOLDABLE METALLIC GAUZE PACK AND SEGMENT

This invention relates to a laminated article, particularly to such an article comprising a gauze pack containing two or more gauzes such as are typically used as catalyst catchment or getter means in nitric acid production plants.

In the industrial production of nitric acid, it is common practice first to prepare nitric oxide by passing a mixture of ammonia and air at elevated temperature through an oxidation catalyst comprising one or more gauzes woven from wire comprising an alloy of platinum and rhodium. In use, platinum and, to a lesser extent, rhodium are themselves converted to their oxides which are volatile at the plant operating temperatures obtaining and are, in consequence, carried away in the nitric oxide stream to be eventually deposited on cooler parts of the plant downstream of the catalyst or lost altogehter to atmosphere.

In order to reduce these losses of platinum and rhodium to an acceptable level, catchment gauze packs have been developed for insertion in the catalytic reactor immediately downstream of the catalytic gauze or gauzes. Typically, such packs consist of interleaved gauzes woven from, respectively, a getter material and a support material. A suitable and commonly-used getter material is an alloy of palladium and gold, for example 20% gold-palladium, and a suitable support material is an oxidation-resistant stainless steel such as Megapyr 2 (Registered Trade Mark).

A sectional view of a typical ammonia oxidation reactor is shown in FIG. X of the accompanying drawings. In FIG. X, the catalytic platinum-rhodium gauzes are shown at 1 supported on a catchment pack 2 of interleaved stainless steel support and gold/palladium getter gauzes. The entire catalyst/catchment gauze assembly is clamped together with a gasket 3 between reactor flanges 4. Heavy support bars 5 are provided across the area of the reactor. FIG. Y of the accompanying drawings shows a detail of an alternative means of assembling and supporting a catchment gauze pack in which the gauzes are slightly smaller in diameter than the reactor, thus allowing the peripheral expansion space 6, and are supported on a coarse gauze 7 fabricated from, for example, "Inconel" steel itself supported on the heavy support bars. Additionally, in this arrangement, the uppermost stainless steel gauze is oversize relative to the remainder of the getter and support gauzes and is folded over peripherally and beneath the said remainder of gauzes at 8 so that the entire catchment gauze pack may then be handled as a unit. This is particularly desirable because, although the getter material is capable of retaining its gettering activity over a period amounting to twice or more times the useful lifetime of the catalytic gauzes, (known in the art as a "campaign"), in use the getter material suffers embrittlement leading to failure of the gauze on movement which usually means in practice that it needs to be discarded early, that is, at the end of a campaign when the reactor is dismantled to renew the catalytic gauzes, or earlier if there is some other reason requiring the reactor to be dismantled. Clearly the ability to handle the catchment pack as a unit which is fairly rigid tends to mitigate this drawback but, particularly on low- or medium-pressure oxidation plants which may have a reactor diameter in the region of 3 meters or more, there is an inherent degree of flexibility in the pack which causes embrittled gauzes to fail on handling. Additionally, of course, a catchment gauze pack suitable for such a large diameter reactor is a particularly heavy and bulky item to store in security, to transport and generally to handle.

It is, therefore, an object of the invention to provide a catchment gauze pack which is substantially rigid, is easy to store and transport and may readily be removed from and replaced in a catalytic reactor such as an ammonia oxidation reactor without failure of the getter material.

We have now found that catchment gauze packs may comprise a plurality of pack segments, for example sectors, which may be located in contiguous relationship one with another in a reactor to provide together in effect a catchment gauze pack extending over substantially the entire surface area of the catalytic gauzes.

According to one aspect of the invention, therefore, a gauze pack segment suitable for locating in planar contiguous relationship with one or more further gauze pack segments to provide a gauze pack having a predetermined, for example, a regular geometric shape comprises a plurality of superposed gauze segments having at least when assembled substantially identical shape and area and held in fixed relationship one with another.

According to a second aspect of the invention, a method of providing a gauze pack having a regular geometric shape comprises locating in planar contiguous relationship one with another two or more gauze pack segments, each pack segment comprising a plurality of superposed gauze segments having at least when assembled substantially identical shape and area held in fixed relationship one with another.

This invention also includes a gauze pack when made from a plurality of segments according to the first or second aspects of the invention.

Where the gauze pack is intended for use as a catchment gauze pack of a catalyst reactor such as an ammonia oxidation reactor, alternate gauze segments may be made of a support material such as an oxidation-resistant stainless steel, for example Megapyr 2, and interleaved between adjacent pairs of said support material may be gauze segments made of a getter material such as an alloy of palladium and gold, for example, 20% gold-palladium, although other getter materials may be used, particularly less robust materials or materials which in use become less robust.

A gauze pack segment according to the invention may have the form of a sector, for example a hemisphere or a quadrant, or another shape which, when located in planar contiguous relationship with one or more further gauze pack segments (which further segment or segments may or may not have the same or similar shape to the first segment) provides a gauze pack having a regular geometric shape. It is normally preferred that the regular shape is circular, but other shapes, for example rectangular, square or polygonal, for example hexagonal, are feasible.

This invention also includes methods of making gauze pack segments. For example, a gauze pack segment according to the invention may be made merely by assembling or superposing gauze segments of the required material and shape in the required order and securing them together to form a pack. Securing may be achieved for example by folding one or more marginal portions of an outermost gauze over an edge of the assembly (in which case at least one gauze segment should be oversize relative to the remainder to provide a suitable marginal portion), or by welding, riveting, tieing with wire and the like. We have found, however, that an elegant and highly effective way of preparing a gauze pack segment according to the invention comprises folding an entire gauze and optionally interposing between resulting segments further gauze segments to provide a suitable laminated pack and the description which follows is particularly for providing a pack segment in such a way in the shape of a sector of a regular geometric shape.

Accordingly, there is provided a method of folding a gauze to provide a gauze pack segment, the gauze having a regular geometric shape, the method comprising the steps of:

(a) forming a generally radially extending slot from the periphery of the said gauze to at least the centre thereof;

(b) notionally dividing the gauze of (a) into a plurality of regions (n) each region having substantially the same shape and area and defined on two sides by generally radially extending boundaries;

(c) applying to each of (n-1) areas, individual subsidiary gauze segments having substantially the same area and shape as the said regions, and (d) thereafter, folding the regions upon one another to produce a folded article having a shape corresponding to one region.

Conveniently, the act of folding results in the regions of the gauze of step (b) being interleaved with the subsidiary gauze segments of step (c).

Preferably, one gauze region of step (b) has a lug which, when folding has been completed, is itself folded over the folder article to prevent unfolding.

The method is particularly applicable to catalyst catchment gauzes. For example, the gauze of step (a) may be made from a first material, e.g., stainless steel, and the subsidiary gauze segments may be made from a different material, e.g. a 20% gold/palladium alloy.

One form of putting the method into practice will now be described, by way of example, with reference to the accompanying drawings.

In FIG. 1 there is shown an oxidation resistant stainless steel gauze A of generally circular shape having a retaining lug B which has a peripheral extent of 90° i.e. between twelve o'clock and three o'clock. The gauze A has a radial slot C at nine o'clock which extends from the centre thereof and opening at the circumference as shown.

FIG. 2 shows three gauze segments D1, D2 and D3 in the shape of quadrants (one shown in FIG. 3) superimposed upon gauze A to form an assembly as shown and gauze segments D1, D2, and D3 are woven from e.g., a 20% gold/palladium alloys.

FIGS. 4A and 4C show the sequential folding of the assembly of FIG. 2 into a quadrant shape.

In order to prevent the so-sequentially folded quadrant from opening and the quadrants D1, D2 and D3 becoming separated from the gauze A, the lug B is folded as indicated at FIG. 4D. A cross-sectional view of the folded quadrant is shown in FIG. 4E showing how lug B acts as a retaining means.

Obviously, the slot could be at a different location, e.g. 6 o'clock with respect to the lug and a different folding sequence employed, or a folding sequence could be employed which does not require the provision of a slot.

Four discrete sequentially folded gauze pack quadrants may be located in planar contiguous relationship one with another to form a circular arrangement for location in a catalyst reactor, although we have found that for many purposes it is convenient to hingeably connect the segments in such a way that they can themselves be folded for transportation and storage so that the entire gauze pack assumes the shape and area of the individual segments thereof.

For locating in a catalyst reactor, for example, the folded pack is merely placed on the support bars or other support means with the radial edge of the folded pack adjacent to the inner edge of the reactor body and the pack is unfolded so that individual gauze pack segments lie in planar contiguous relationship one with another to substantially cover (excepting a peripheral expansion gap and small gaps between hinged edges of adjacent pack segments and the like) the cross-sectional area of the reactor.

Figure 5E:
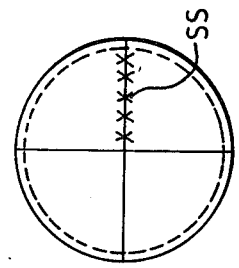
Figure 5D:
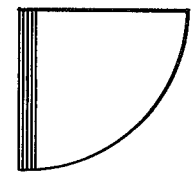
Figure 5C:
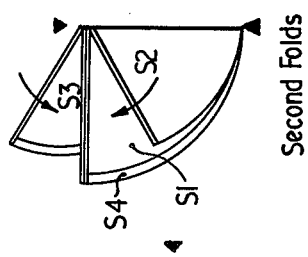
Figure 5B:
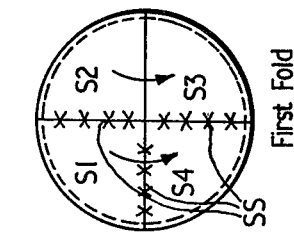
Figure 5A:
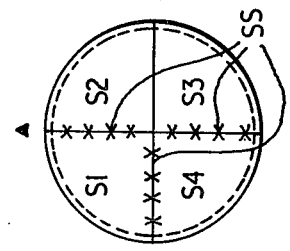
Figure 6A:
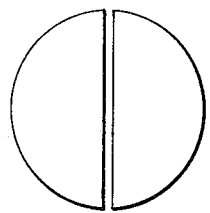
Figure 6B:
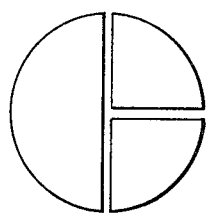
Figure 6C:
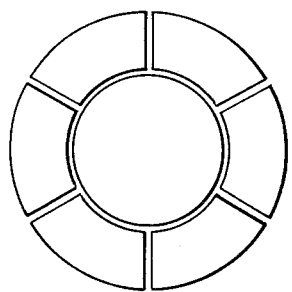
Figure 6D:
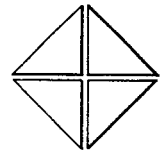
Figure 6E:
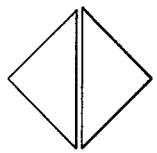
Figure 6F:
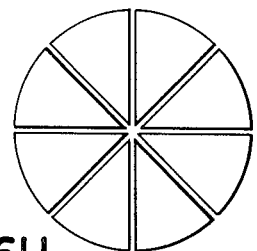
Figure 6G:
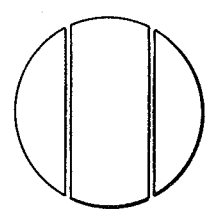
Figure 6H:
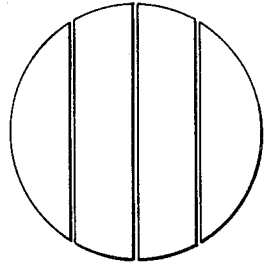
Figure 6J:
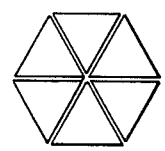

One way of hingeably connecting four gauze pack segments such as shown in FIG. 4 is shown in FIGS. 5A–5E. In FIG. 5A four gauze pack segments S1, S2, S3 and S4 are shown hingeably connected at mutually opposed edges between gauzes S1 and S2, S1 and S4, and S3 and S4 respectively. Hingeable connections are shown at SS. FIG. 5B illustrates the first fold (i.e. segments S1 and S2 together folded on segments S3 and S4) and FIG. 5C illustrates the second and third folds (i.e. segments S3 and S2 respectively folded back upon segments S4 and S1). FIG. 5D illustrates the resulting folded gauze pack segments, and FIG. 5E shows the pack segments unfolded to provide a gauze pack as located in, for example, a catalyst reactor. Optionally, the segments S2 and S3 can be held together, for example by stitching, as shown in FIG. 5E at SS (the original hingeable connections being omitted for the sake of clarity).

One pack segment according to the invention may be hingeably connected with another by any convenient method, for example by stitching, by the use of hoops or by hoops and rods. The material from which hoops or other hingeing means are made should obviously be capable of withstanding conditions obtaining in whatever use the gauze pack is to be put and should preferably be reasonably flexible for ease of folding and non-interference with, for example, adjacent catalyst gauzes. Optionally, hingeable connections may be made or broken, e.g. by inserting or removing a rod from a series of hoops, on site.

Although the invention has been particularly described with reference to a gauze pack segment formed in the shape of a quadrant by folding in a particular way, it is to be appreciated that the invention provides a pack segment comprising a plurality of gauze segments which may be assembled merely be stacking one on another and securing the resulting stack so that the individual segments are held in fixed relationship one with another. Alternative embodiments of the invention are illustrated in FIG. 6 of the accompanying drawings, in which are shown ways in which gauze pack segments may be located in planar contiguous relationship one with another to provide a gauze pack having a regular geometric shape. Individual gauze pack segments of FIG. 6 may optionally be hingeably connected to an adjacent segment.

In some catalyst catchment gauze systems, a pad of knitted wire or a pad of randomly-orientated compressed wire is used instead of a gauze pack. Such pads, for ease of handling, transportation and the like, can be divided into segments similar to those according to the invention and optionally hingeably connected together.

Catchment and other gauze packs may have diameters of up to several meters and their provision in segments optionally hingeably connected together as above described saves a considerable amount of space during transportations from a manufacturer to the site, for example a nitric acid plant. Furthermore, in certain cases, transportation costs are calculated on the "girth" of the article and the invention results in a considerable reduction in girth.

A catchment gauze pack consisting of segments according to the invention may be readily installed in a plant and may also be readily removed, either by removing individual pack segments or by folding segments if they are hingeably connected and removing the entire pack, without damaging the getter material. The removed pack may easily be handled, stored in security during plant maintenance and the like, or transported for the purpose of refining and platinum recovery.

We claim:

1. A gauze pack segment for use in an assembly of a foldable gauze pack, the said segment being suitable for locating in a plane with similar segments and in edge to edge contiguous relationship with at least one adjacent segment to form a gauze pack having a predetermined geometric shape, the pack segment comprising a plurality of superposed gauze segments having at least when assembled substantially identical shape and area and held in fixed relationship one with another, in which at least two adjacent segments are hingeably connected, alternate gauze segments being woven from a first metallic material with a gauze segment woven from a second metallic material being interleaved between said alternate gauze segments, each said gauze segment having the form of a sector of a circle.

2. A gauze pack segment according to claim 1 and suitable for use in an ammonia oxidation reactor in which the first material comprises a support material and the second material comprises a getter material.

3. A gauze pack segment according to claim 2 in which the support material comprises an oxidation-resistant stainless steel.

4. A gauze pack segment according to claim 2 in which the getter material comprises an alloy consisting essentially of gold and palladium.

5. A gauze pack segment according to claim 1 in which the sector is a hemisphere.

6. A gauze pack segment according to claim 1 in which the sector is a quadrant.

7. A gauze pack having a regular geometric shape and comprising two or more gauze pack segments according to claim 1.

8. A gauze pack according to claim 7 in which the segments have substantially identical shape and area.

9. A gauze pack according to claim 7 in which at least two of the segments have a different shape and area from each other.

10. A foldable gauze pack having a regular geometric shape and comprising at least two pack segments in which at least two adjacent segments are hingeably connected, comprising a plurality of superposed gauze segments having at least when assembled substantially identical shape and area and held in fixed relationship one with another, alternate gauze segments being woven from a first material with a gauze segment woven from a second material being interleaved between said alternate gauze segments, the said first material comprising an oxidation-resistant stainless steel support material and the second material comprising a getter alloy consisting essentially of gold and palladium.

* * * * *